Patented Jan. 12, 1954

2,666,013

UNITED STATES PATENT OFFICE 2,666,013

PRURITUS THERAPY

Edgar A. Ferguson, Jr., Brooklyn, N. Y.

No Drawing. Application August 25, 1950,
Serial No. 181,573

6 Claims. (Cl. 167—63)

This invention relates to a new and improved therapeutic agent for local topical application in the treatment of pruritus, and is more particularly concerned with the production of a therapeutic agent highly useful in the local topical treatment of pruritus ani.

Pruritus ani has always been difficult to treat and a problem of real importance to the patient and physician. The disease occurs in apparently healthy individuals and is characterized by a history of marked itching of the perianal skin which becomes reddened, fissured, and sometimes moist and macerated.

Numerous shallow fissures are usually present, often extending back to the coccyx and often anteriorly to the scrotum or vagina. The presence of whitish edges of skin along these fissures and even beyond is often observed. External hemorrhoids or tabs are usually thickened and when excised the wounds heal sluggishly with the same white, fibrotic edges.

Many causes have been advanced for pruritus ani. By reason of the symptomatic relief produced the nervous system has been the target of attack both by means of local anesthetic agents and by means of antispasmodics and sedative agents. There is a long list of so-called causative agents such as: fistulae, infected crypts, fissures, food allergy, hepatic insufficiency, caustic soap, pin worms, and others. These, together with the nervous syndrome, comprise the group which may be medicated collaterally with good results.

The remainder comprises a great bulk of cases which must be treated directly and the long list of treatments suggests that no single good result has been obtained. This large group may be called "essential" pruritus and no satisfactory treatment has yet been discovered.

Up until the advent of the present invention many different types of treatment have been recommended and employed. These treatments fall into the following main classes: (1) Avoidance of irritating external factors; (2) Dietary changes; (3) Bromides and phenobarbital; (4) Laxatives; (5) Potassium iodide to relieve fungus infections; and (6) Various empirical formulas such as phenol and calomine lotion, acetanilid and petrolatum, dithymol di-iodide and bismuth subcarbonate, lime water and milk or mercuric chloride, phenol, salicylic acid, camphor, and glycerine, balsam Peru and castor oil.

Attempts at imitating the action of pruritus on healthy skin led to the use of an agent known as ammonium oleate. This causes actual pruritus in some cases. In addition, experimental evidence has shown that the irritant forming the whitish edges of skin along the fissures may be reproduced at the same time by an astringent agent such as tannic acid. Another series of compounds inducing irritation similar to pruritus ani are the ammonia series. Dilute solution of ammonia water reproduces many of the itch symptoms. Finally, the general condition of poor nutrition in the area of pruritus ani may be reproduced by an ointment containing large amounts of microscopic crystalline methionine (an amino acid).

To sum up the experimental clinical findings in reference to causative agents we have the following list: (1) ammonium oleate; (2) tannic acid; (3) ammonia water; and (4) microscopic crystals of methionine.

Astringent, direct irritant, or protein precipitant properties reproduce pruritus ani in healthy skin. Together with the specific finding in reference to methionine, this knowledge was found to aid considerably in elaborating the mechanism causing this treacherous disease. It is entirely possible that a combination of the excretion leaking from the anus and the excessive amount of sweat found in the perineal area combine to cause pruritus ani, whenever the nutrition of the skin is so changed to allow the result.

In accordance with the present invention, it has now been discovered that, because of certain deficiencies characteristic in this disease, a particular mixture of amino acids and polypeptides may be provided which, when brought into contact with the perineal surface in the form of a poultice, causes the itch to subside and the skin to regenerate to form normal skin without itch. The discovery of this principle has made it possible to elaborate a new therapeutic agent for the treatment of pruritus.

It has been determined, further in accordance with the invention, that the usual combination of so-called essential amino acids found in conventional protein hydrolysates is not satisfactory for this purpose. This usual amino acid mixture, which is the result of enzymatic digestion or acid digestion of milk protein or milk casein or yeast proteins, contains argenine, histadine, lysine, tyrosine, tryptophane, phenylalanine, cystine, methionine, threonine, leucine, isoleucine, and valine.

A study of these amino acids separately has shown that some are partly beneficial, some are indifferent in their effect, and some irritate; but none alone are completely satisfactory in pruritus therapy. A study made of the effect of a poultice of each of these separate amino acids has revealed the following:

| Amino Acid | Effect |
| --- | --- |
| Argenine | Indifferent. |
| Histidine | Slight irritation. |
| Lysine | Indifferent. |
| Tyrosine | Do. |
| Tryotophane | Slightly beneficial. |
| Phenylalanine | Do. |
| Cystine | Slightly irritating. |
| Methionine | Strongly irritating. |
| Threonine | Indifferent. |
| Leucine | Slightly beneficial. |
| Isoleucine | Indifferent. |
| Valine | Slightly beneficial. |

The discovery that certain of the amino acids in the combination caused irritation, led to the formation of a novel complex from which significant amounts of methionine, cystine and histidine, together with certain water-insoluble components, have been removed. This novel complex, containing a particular amino acid mixture, along with polypeptides and unreacted proteins, is the basis of the present invention and the essential ingredient of final therapeutic agent. Of equal importance is the novel procedure by which this complex is formed.

The new therapeutic agent for local application in the treatment of pruritus ani is composed of a specially prepared protein digest containing a particular mixture of amino acids and polypeptides, and is prepared by subjecting a protein such as lactalbumin to conventional hydrolysis, treating the hydrolysate in a special way to remove undesirable amino acids and some of the more water-insoluble fractions of the digested protein, and then further digesting and dehydrating by heat.

The lactalbumin used consists of plain untreated lactalbumin derived from milk. The analysis of the lactalbumin used for the majority of the tests was as follows: protein 82.5%, ash 8.2%, moisture 2.6%, the remainder consisting of certain carbohydrate materials which are eliminated by filtration during the process of hydrolysis.

The initial step in the process consists in the formation of lactalbumin hydrolysate, in a conventional manner, by enzymatic digestion with pork pancreas. The menstruum for digestion consists of a 10% solution of one normal hydrochloric acid. About 1% of comminuted pork pancreas is added to this solution together with about 10% of lactalbumin. This is placed in a water bath and maintained at a temperature of 52° C. for a period of 2½ hours with constant agitation. At the end of this time filtration will remove the solid particles and the remainder is spray dried to form a flaky powder of enzyme digested hydrolysate. This initial lactalbumin hydrolysate is a mixture of amino acids and polypeptides along with some protein elements which are undigested. These are expressed by the difference between the total nitrogen content and the amino nitrogen content minus the polypeptide content (approximately 2.5%). The chemical composition is as follows:

| | Per cent |
| --- | --- |
| Total nitrogen | 11.5 |
| Amino nitrogen | 7.5 |
| Ash | 4 |
| Moisture | 4 |

The amino acid content of the amino nitrogen is as follows:

| | Per cent |
| --- | --- |
| Argenine | 3.5 |
| Histidine | 2 |
| Lysine | 8 |
| Tyrosine | 5.3 |
| Tryptophane | 2.3 |
| Phenylalanine | 5.6 |
| Cystine | 3 |
| Methionine | 2.8 |
| Serine | 4.9 |
| Threonine | 5.3 |
| Leucine | 15 |
| Valine | 4 |
| Alanine | 1 |

It should be understood that other methods of hydrolysis will yield a mixture of substantially the same analysis when applied to lactalbumin. One such method, as an alternative, is the application of heat to an aqueous acid solution of the lactalbumin. For instance 100 grams of lactalbumin may be added to 200 cc. of water containing 20 cc. of 12 normal hydrochloric acid. The solution is boiled in a reflux condenser for approximately 2 hours. At the end of that time the excess acid is neutralized with sodium hydroxide. The hydrolysate is dried and powdered.

Other proteins will yield products of similar analysis but not the same. For instance, the hydrolysis of yeast protein by enzymes yields a product higher in methionine. This is undesirable from the standpoint of a pruritus remedy because the amount of methionine must be reduced to a very low point before irritation caused thereby is eliminated.

The water solubility of the lactalbum hydrolysate and polypeptides described above is determined. A solution is then prepared so that all but 10% of the lactalbumin hydrolysate and polypeptides dissolve at room temperature. The range of this solution is from 3.25 to 3.75 grams in 11 cc. of water. The average amount is 3.5 grams in 11 cc. of water. The solution is allowed to stand at room temperature for 4 hours, after which time it is stored overnight at a temperature of 50° F. and then decanted. Finally, the solution is filtered on a Buchner funnel with suction. It is at this point that the bulk of the methionine crystals and some of the more water-insoluble fractions of the enzymatic digested proteins have been removed.

The resulting clear filtrate is subjected to further hydrolysis by boiling down in a flat pan over a Bunsen flame to near dryness. The boiling process is carried on at temperature of 110° C. and must be continued for at least 3 hours in order to convert all of the remaining protein residues to polypeptides and amino acids. The final mixture has been shown to be deficient in methionine content, the original 2.8% having been reduced to less than 0.8%. The process lowers the quantity of histidine to approximately 1%, the amount of cystine to approximately 1% and reduces the total amount of unchanged protein substances to a negligible quantity while increasing the polypeptides to at least 3.5%. The amounts of amino acids present after treatment are approximately as follows:

| | Per cent |
|---|---|
| Argenine | 3.5 |
| Histidine | 1 |
| Lysine | .8 |
| Tyrosine | .5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 |

The percentage range of most of these constituents may be varied considerably (50% to 100%) without seriously interfering with the efficiency of the mixture. However, it is desirable to keep methionine as low as possible, between 0.4 and 0.8%. It is also desirable to keep the percentage of histidine below 1%, and the amount of cystine below 1 or 2%. In the final mixture the total nitrogen remains the same, being approximately 11.5%. The amount of amino nitrogen is increased to approximately 8% while the amount of organized protein revealed by Folin's reagent is reduced to less than 1%, demonstrating that the 4% difference between total nitrogen and amino nitrogen is not occupied any longer by organized protein but by additional polypeptides by reason of the boiling process.

When the mixture has boiled for the required time it is allowed to dry to a paste. The paste is then cooled and incorporated into an inert vehicle base to form the final ointment. Any convenient ointment vehicle may be employed, such as petrolatum, carbowax, mineral oil, olive oil, purified lard, stearic acid and stearates, waxes, wool fat, etc. or various mixtures thereof, so long as the ointment vehicle does not irritate the skin. The paste is present in the vehicle in amounts of 5–15% and preferably 10%. Carbowax has been found to be particularly useful. This is a material which is bland, odorless, and solid with a consistency of low melting petrolatum. The white grade is used for cosmetic and pharmaceutical use. The product preferred is known as 1500, and is composed of equal parts of polyethyleneglycols with an average molecular weight of 300 and a saturated fatty acid ester of polyethyleneglycol with an average molecular weight of 1540. The mixture has an average molecular weight between 500 and 600. This product is characterized by a low melting point, chemical stability, solubility for many pharmaceuticals, inertness toward therapeutic agents, and inability to support mold growth. It is readily available from the Carbide & Chemicals Corporations. The foregoing Carbowax 1500 provides a comparatively hard ointment vehicle base. A medium variety can be prepared by utilizing ½ the above mixture plus ½ of polyethylene glycols with an average molecular weight of 600. A liquid variety may be made from polyethylene glycols with an average molecular weight of 600.

It may be found desirable to incorporate between 5 to 10% of petrolatum U. S. P. with each of the above formulas.

Also, a series of mineral oil bases may be made by utilizing petrolatum U. S. P. alone for the hard base, petrolatum U. S. P. plus 15% heavy Russian mineral oil for the medium base and a mixture of petrolatum U. S. P. plus 25% heavy Russian mineral oil for the very liquid type of base.

Still another series of formulas contains purified lard. This purified lard is deodorized by means of charcoal and preserved by ¼ of 1% tincture of benzoin, N. F. Various grades of lard may be used to achieve the heavy or light variety of base.

Another series of bases may be made with combinations of mineral oil and sodium stearate. A combination containing about 25% sodium stearate the rest heavy Russian mineral oil makes a suitable base when properly mixed and heated. Wax may be added in the form of stearic acid 40% for the heard variety, 25% for the soft variety, and 5% for liquid type.

The official ointments contain white petrolatum, yellow wax or white wax the proportions which may be varied to maintain a suitable consistence under different climatic conditions. A typical formula for this type of ointment base is petrolatum 10%; white petrolatum 5%; white wax 15%; yellow wax 5%; stearic acid q. s.

Ointments may be prepared in accordance with the official N. F. types from olive oil 5%; wool fat (adeps lanae, not hydrated) 40%; petrolatum 55%. When this type of ointment base is used the protein hydrolysate must be triturated with the olive oil in a glass mortar until perfectly smooth. The wool fat is then incorporated followed by the petrolatum. This is mixed thoroughly. The above formula gives a salve of uniform medium hardness at all temperatures. When the amount of olive oil is increased to 10% and the petrolatum to 65% with consequent decrease in wool fat a very soft ointment may be prepared. An ointment of medium hardness may be made of the same formula using hydrated wool fat.

In some instances, the ointment may be rather dark in color, in which case the following procedure may be employed: 100 grams of the final paste is mixed with 8 grams of activated charcoal, and then, after filtration, incorporated into the ointment vehicle.

Excipients such as perfume may be added as desired, the only requirement being that the addition should not result in irritation to the skin.

When the ointment is applied to the affected areas immediate relief is obtained, and, within a week, there is complete alleviation of pruritus symptoms. Ointment was applied in every case to the perineal area and if necessary around the vaginal or scrotal areas as well. Most patients reported immediate cooling effect from the treatment. The skin changes which take place while healing are easily observable and are both interesting and significant. The moisture disappears first. This is followed by fading of redness in inflamed areas. The white ridges where precipitation of protein has been pronounced become less noticeable, until finally the perianal region assumes its normal color. The change in texture is even more marked. The fibrotic, inelastic skin which fissures readily become soft and pliable. Within a few weeks' time there is every appearance of normal skin.

What is claimed is:

1. A new therapeutic composition useful in local topical treatment of pruritus ani which comprises an inert polyethylene glycol ointment base carrying 5%–15% of the lactalbumin hydrolysate of claim 3 whose amino acid content is approximately as follows:

| | Per cent |
|---|---|
| Argenine | 3.5 |
| Histidine | 1 |
| Lysine | 8 |
| Tyrosine | 5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 |

2. A new therapeutic composition useful in local topical treatment of pruritus ani which comprises an inert ointment base carrying the lactalbumin hydrolysate of claim 3 whose amino acid content is approximately as follows:

| | Per cent |
|---|---|
| Argenine | 3.5 |
| Histidine | 1 |
| Lysine | 8 |
| Tyrosine | 5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 |

3. A new therapeutic composition useful in local topical treatment of pruritus ani which comprises a topical vehicle and lactalbumin which has been subjected to substantial hydrolysis to yield a hydrolysate initially containing organized protein and therapeutically effective amounts of a plurality of free, simply amino acids, including tryptophane, phenylalanine, leucine and valine, specific in their local topical application to alleviate pruritus symptoms, admixed with skin-irritating amounts of methionine, histidine and cystine, said hydrolysate being subsequently heat-modified to decrease the initial organized protein content to less than 1%, and reduce said methionine content to the order of 0.4% to 0.8%, the histidine content to below 1% and the cystine content to below 2%.

4. A new therapeutic composition useful in local topical treatment of pruritus ani which comprises an inert ointment base carrying lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their local topical application to alleviate pruritus symptoms, admixed with skin-irritating amounts of methionine, histidine and cystine, said hydrolysate being subsequently heat-modified to decrease the initial organized protein content to less than 1%, and reduce said methionine content to the order of 0.4% to 0.8%, the histidine content to below 1% and the cystine content to below 2%.

5. A new therapeutic composition useful in local topical treatment of pruritus ani which comprises an inert polyethylene glycol ointment base carrying lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their local topical application to alleviate pruritus symptoms, admixed with skin-irritating amounts of methionine, histidine and cystine, said hydrolysate being subsequently heat-modified to decrease the initial organized protein content to less than 1%, and reduce said methionine content to the order of 0.4% to 0.8%, the histidine content to below 1% and the cystine content to below 2%.

6. A new therapeutic composition useful in local topical treatment of pruritus ani which comprises an inert polyethylene glycol ointment base carrying 5% to 15% of lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their local topical application to alleviate pruritus symptoms, admixed with skin-irritating amounts of methionine, histidine and cystine, said hydrolysate being subsequently heat-modified to decrease the initial organized protein content to less than 1%, and reduce said methionine content to the order of 0.4% to 0.8%, the histidine content to below 1% and the cystine content to below 2%.

EDGAR A. FERGUSON, JR.

References Cited in the file of this patent

UNITED STATES PATENTS

| Number | Name | Date |
|---|---|---|
| 2,174,009 | Nitardy | Sept. 26, 1939 |
| 2,386,926 | Block | Oct. 16, 1945 |

FOREIGN PATENTS

| Number | Country | Date |
|---|---|---|
| 499,391 | Great Britain | Apr. 20, 1937 |

OTHER REFERENCES

Bariatti Minera Medica, vol. 37 (1946), page 273.

Hesemann, Fette und Seifen, January 1942, pgs. 42–44.

Sahyun Proteins and Amino Acids in Nutrition, Reinhold Publ. Corp., N. Y., 1948, page 206.

Martindale, Extra Pharmacopoeia, vol. 1, 20th Ed., pgs. 660, 670 (1932). London, H. K. Lewis.

Nicolas et al., Bull. Soc. Franc. de Dermato et Syph., February 1936, pp. 830–834.

Hopkins, An Introduction to Biochemistry, 3rd Ed., 1947, Grove and Stratton, N. Y., page 157.

Ludwig, Repertorium Pharmazeutischer Spezialpräparate, 1948 Basel Verlagsgesellschaft Beobachter, pgs. 523, 1141.

Maynard, J. Invest. Dermatology, April 1947, vol. 8, No. 4, pgs. 223–225.

Janistyn, Kosmetisches Prakticum, Teil II, Band B, 1941, pgs. 260–262.